United States Patent

Bradley et al.

[11] Patent Number: 5,380,205
[45] Date of Patent: Jan. 10, 1995

[54] EMERGENCY TOY

[76] Inventors: Joe A. Bradley, 3576 Southland, Memphis, Tenn. 38109; George Spector, 233 Broadway Rm 702, New York, N.Y. 10279

[21] Appl. No.: 110,714
[22] Filed: Aug. 23, 1993
[51] Int. Cl.⁶ .................................................. A44C 3/00
[52] U.S. Cl. ........................................ 434/236; 40/1.5; 40/1.6
[58] Field of Search ............... 434/236, 395, 396; 40/1.5, 1.6; 446/28; D11/95

[56] References Cited

U.S. PATENT DOCUMENTS

| | | | |
|---|---|---|---|
| 3,927,375 | 12/1975 | Lanoe et al. | 40/1.5 X |
| 4,531,310 | 7/1985 | Acson et al. | 40/1.5 |
| 4,710,145 | 12/1987 | Vandis | 434/236 |
| 4,875,238 | 10/1989 | Solomon et al. | 446/28 |
| 4,961,275 | 10/1990 | Klein | 40/1.6 X |
| 5,010,665 | 4/1991 | Clinkscales | 40/1.6 X |
| 5,138,779 | 8/1992 | Earnest | 40/1.6 |
| 5,204,670 | 4/1993 | Stinton | 340/825.54 |

Primary Examiner—Richard J. Apley
Assistant Examiner—Glenn Richman

[57] ABSTRACT

An emergency toy is provided which consists of a badge simulating an emergency and rescue department emblem. A device is for removably attaching the badge to a garment of a child. An electronic circuit is built within the badge, which when activated by the child during a simulated emergency situation, will relay an audible message that will say "CALL 911", thereby teach and familiarize the child with emergency personnel and the very important emergency telephone number.

2 Claims, 1 Drawing Sheet

EMERGENCY TOY

BACKGROUND OF THE INVENTION

The instant invention relates generally to teaching devices and more specifically it relates to an emergency toy, which provides emergency and rescue department emblems, to help teach children for emergency situations.

There are available various conventional teaching devices which do not provide the novel improvements of the invention herein disclosed.

SUMMARY OF THE INVENTION

A primary object of the present invention is to provide an emergency toy that will overcome the shortcomings of the prior art devices.

Another object is to provide an emergency toy that will help parents teach and familiarize their children with emergency personnel and the very important 911 emergency telephone number.

An additional object is to provide an emergency toy that is in the shape of emergency and rescue department badges, in which children will remember them better and longer when they equate with symbols.

A further object is to provide an emergency toy that is simple and easy to use.

A still further object is to provide an emergency toy that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

DETAILED DESCRIPTION OF THE PREFERRED EMBODIMENTS

Figure 1:
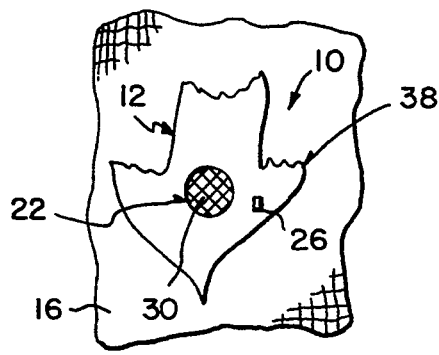
FIG. 1 is an elevational view of the instant invention worn on a garment as a fire department badge.
Figure 2:
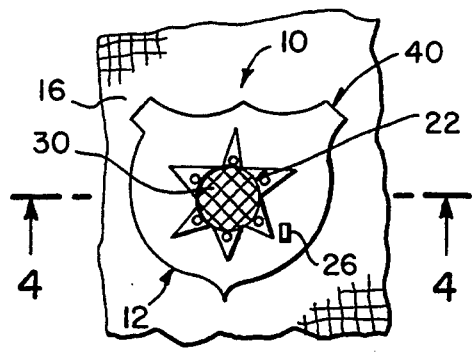
FIG. 2 is an elevational view similar to FIG. 1 as a police department badge.

Turning now descriptively to the drawings, in which similar reference characters denote similar elements throughout the several views, FIGS. 1 through 4 illustrate an emergency toy 10, which consists of a badge 12 simulating an emergency and rescue department emblem. A device 14 is for removably attaching the badge 12 to a garment 16 of a child. An electronic circuit 18 is built within the badge 12 which when activated by the child during a simulated emergency situations, will relay an audible message that will say "CALL 911", thereby teach and familiarize the child with emergency personnel and the very important emergency telephone number.

The electronic circuit 18 contains a recessed button switch assembly 22 on the badge 12, with a battery 24 to supply power. A power switch 26 is on the badge 12, to turn the power on and off. A tape circuit 28 has the audible message therein. A speaker 30 is on the badge 12, so that the audible message can be heard therefrom, when the power switch 26 is turned on and the recessed button switch assembly 22 is pressed by the child.

The electronic circuit 18 further contains a transmitter 32 built into the badge 12. A remote receiver 34 is located at a distance from the badge 12. When the electronic circuit 18 is activated, the transmitter 32 will send a signal 36 to the remote receiver 34, to alert a person there of the simulated emergency situation.

Figure 3:
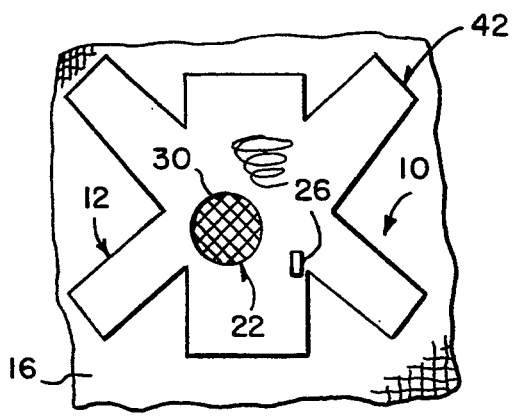
FIG. 3 is an elevational view similar to FIG. 2 as a medical emergency badge.
Figure 4:
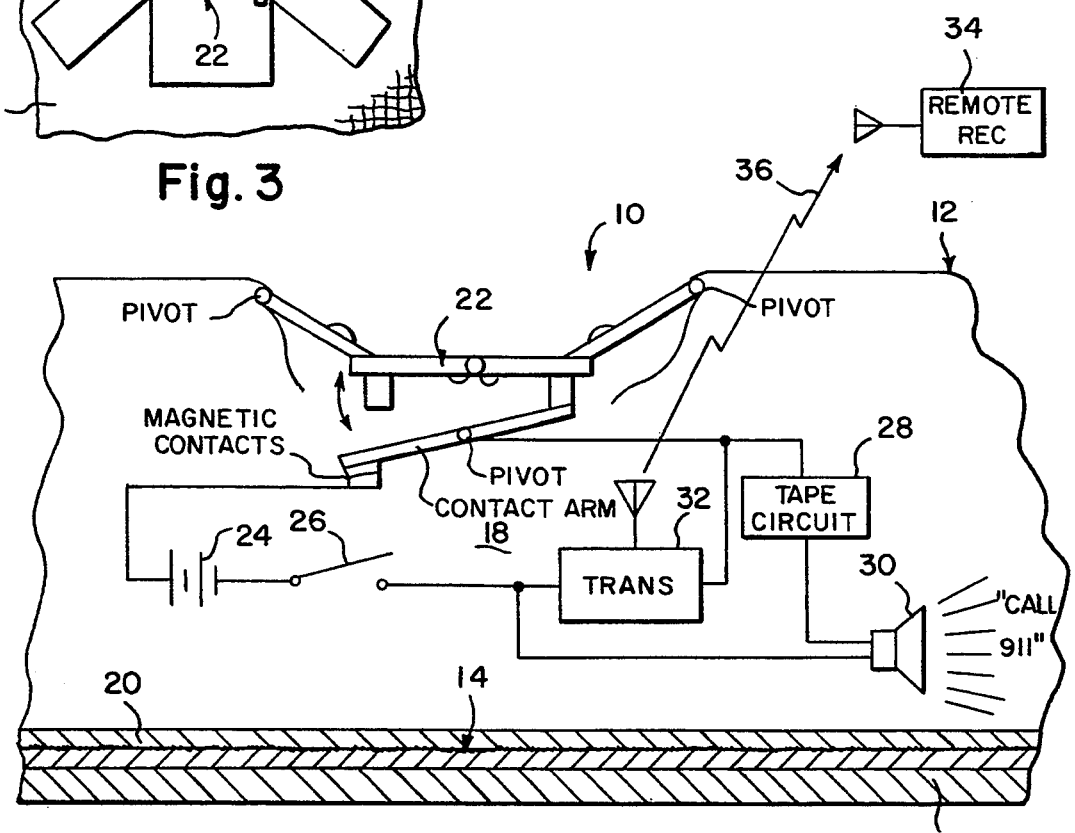
FIG. 4 is a diagrammatic cross sectional view taken along line 4—4 in FIG. 2, showing a schematic block diagram therein of the electrical circuit.

The badge 12 can be in a configuration of a fire department emblem 38, shown in FIG. 1, a police department emblem 40, shown in Figure and a medical emergency emblem 42, shown in FIG. 3.

OPERATION OF THE INVENTION

To use the emergency toy 10, a child simply removably attaches the badge 12 to the garment 16, which can be a shirt. The power switch 26 is then turned on. When a simulated emergency situation arises, the child presses the recessed button switch assembly 22 to relay the audible message "CALL 911". The transmitter 32 will also send the signal 36 to the remote receiver to a person located there.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. An emergency toy for electronic communication with a remote receiver located at a distance from a badge, said toy comprising:
    a) a badge simulating an emergency and rescue department emblem;
    b) means for removably attaching said badge to a garment of a child;
    c) an electronic circuit built within said badge, which when activated by the child during a simulated emergency situation will relay an audible message that will say "CALL 911", thereby teach and familiarize the child with emergency personnel and the very important emergency telephone number, wherein said electronic circuit includes:
    d) a recessed button switch assembly on said badge;
    e) a battery to supply power;
    f) a power switch in said circuit on said badge to turn the circuit power on and off;
    g) a tape in said circuit having the audible message therein;
    h) a speaker on said badge, so that the audible message can be heard therefrom, when said power switch is turned on and said recessed button switch assembly is pressed by the child;
    i) a transmitter in said circuit built into said badge, so that and when said electronic circuit is activated said transmitter will send a signal to said remote receiver to alert a person there of the simulated emergency situation, simultaneous with the audible message;
    j) said switch assembly includes an exterior button pivotally connected to the badge in combination with an interior contact arm in said circuit whereby inward movement of said button to engage said contact arm activates said circuit.

2. An emergency toy as recited in claim 1, wherein said button is in the form of said speaker.

* * * * *